United States Patent [19]

Shimomura

[11] Patent Number: 5,769,578
[45] Date of Patent: Jun. 23, 1998

[54] CRANKSHAFT MILLER AND METHOD OF USE THEREOF

[75] Inventor: Masumi Shimomura, Ishikawa-ken, Japan

[73] Assignee: Kabushiki Kaisha Komatsu Seisakusho, Tokyo, Japan

[21] Appl. No.: 553,608

[22] PCT Filed: May 19, 1994

[86] PCT No.: PCT/JP94/00806

§ 371 Date: Nov. 20, 1995

§ 102(e) Date: Nov. 20, 1995

[87] PCT Pub. No.: WO94/26449

PCT Pub. Date: Nov. 24, 1994

[30] Foreign Application Priority Data

May 19, 1993 [JP] Japan .................................. 5-116853

[51] Int. Cl.[6] ........................................... B23C 3/06
[52] U.S. Cl. ............................. 409/82; 82/106; 409/199; 409/203
[58] Field of Search .................................. 409/131, 132, 409/199, 200, 189, 197, 203, 205; 82/106, 162, 164

[56] References Cited

U.S. PATENT DOCUMENTS

| | | | |
|---|---|---|---|
| 3,880,025 | 4/1975 | Kralowetz et al. | 409/200 |
| 4,171,654 | 10/1979 | Kreucher | 409/189 |
| 4,180,359 | 12/1979 | Schmid | 409/199 |
| 4,269,551 | 5/1981 | Kralowetz | 409/199 |
| 4,305,689 | 12/1981 | Yamade et al. | 409/200 |
| 4,558,978 | 12/1985 | Berbalk | 409/200 |
| 4,679,973 | 7/1987 | Kodama et al. | 409/200 |

FOREIGN PATENT DOCUMENTS

| | | |
|---|---|---|
| 57-25327 | 5/1982 | Japan . |
| 59-42211 | 3/1984 | Japan . |
| 62-50246 | 10/1987 | Japan . |
| 4-111709 | 4/1992 | Japan . |

*Primary Examiner*—Daniel W. Howell
*Attorney, Agent, or Firm*—Wenderoth, Lind & Ponac

[57] ABSTRACT

A crankshaft miller is constructed by providing two cutter units movably in a longitudinal direction of a work between a pair of work heads provided on a bed and supporting both ends of the work. A cutter for machining a main journal and a first resting device are provided in one of the pair of cutter units. A pitch of the cutter for machining a main journal and the first resting device is selected such that when a counterweight is machined by the cutter for machining a main journal, a main journal which is located adjacent a counterweight forming a pair with the counterweight is clamped by the first resting device. A cutter for machining a pin journal and a second resting device are provided in the other of the pair of cutter. A pitch of the cutter for machining a pin journal and the second resting device is selected such that when a pin journal is machined by means of the cutter for machining a pin journal, the main journal adjacent the pin journal is clamped by the second resting device.

8 Claims, 8 Drawing Sheets

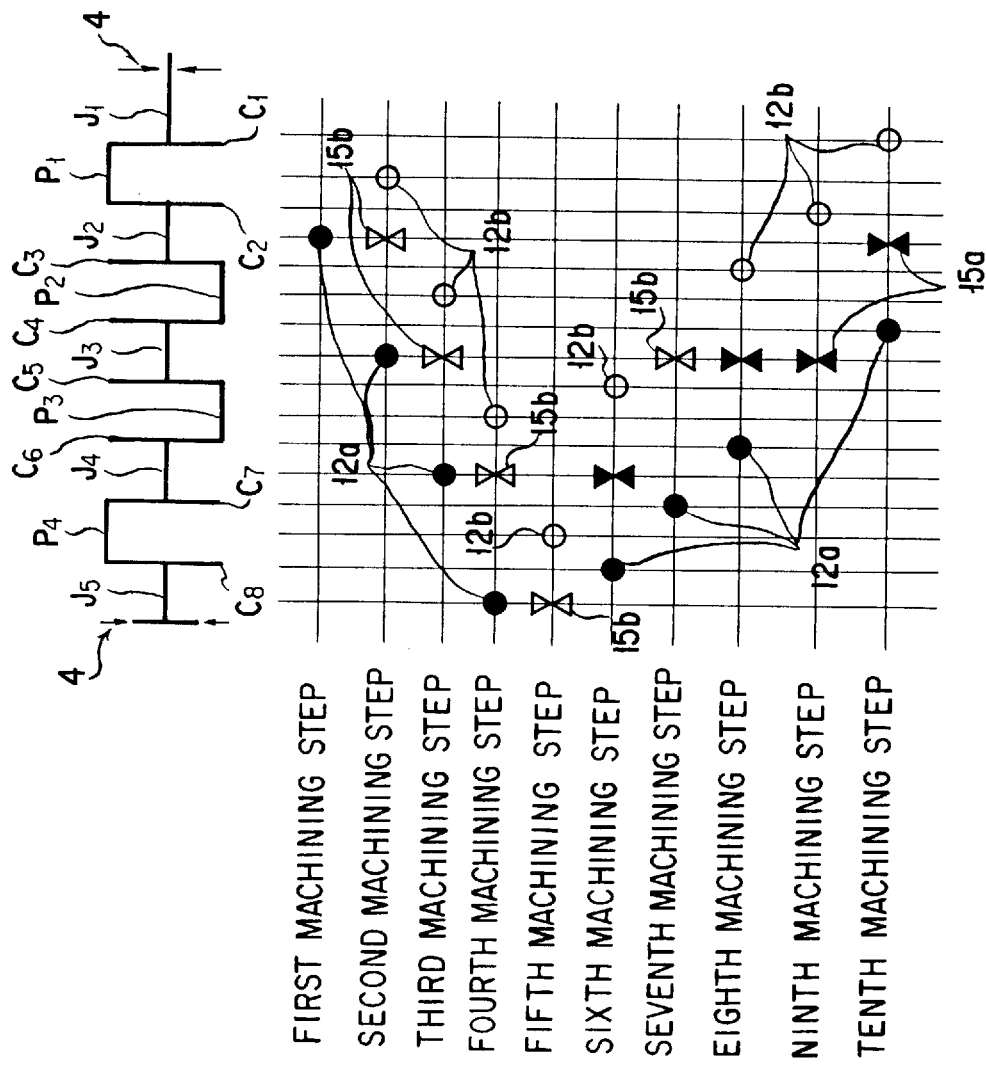

CRANKSHAFT MILLER AND METHOD OF USE THEREOF

TECHNICAL FIELD

The present invention relates to a crankshaft miller for machining a crankshaft for an engine and so forth, and a method of use thereof.

BACKGROUND ART

Conventionally, a crankshaft miller for machining a crank shaft of an engine generally has two work heads supporting both ends of a work (crankshaft). At the side of one work head, a pin journal cutter and a resting device are provided in a movable fashion along the longitudinal direction of the work. At the side of the other work head, a main journal cutter is provided in a movable fashion along the longitudinal direction of the work. Then, when a crankshaft (work a) for a 4-cylinder engine, as shown in FIG. 1, for example, is machined, both ends of the work a is clamped by means of chucks h and i of both work heads. At first, in a condition where no journal is supported by a resting device c, a second main journal b is machined by the main journal cutter f in a first machining step. Then, at a second machining step, under a condition where the second main journal b is clamped by the resting device c, a third main journal g and a first pin journal d are respectively machined simultaneously by means of the main journal cutter f and the pin journal cutter e. Subsequently, in a similar operations, third to fifth machining steps are carried out.

On the other hand, in recent years, due to an associating increase in speed of the engine, improvement of the rotational balance of the crankshaft has been demanded. For answering such demand, the outer periphery of the counterweight of the crankshaft is machined. However, in the conventional crankshaft miller, since a distance between the pin journal and the resting device cannot be modified during machining, the resting device c cannot be placed at an optimal position on the work d. Therefore, chatter may be caused during machining, making machining impossible.

In such a case, in the prior art, the outer periphery of the counterweight is machined by means of a lathe in a separate machining step.

However, in the method of machining the outer periphery of the counterweight employing the lathe in the separate machining step, extra expense is required for installing the lathe. Also, in the separate machining step, preparation, such as alignment and so forth, becomes necessary, lowering productivity.

SUMMARY OF THE INVENTION

The present invention has the purpose of resolving the such defects. Therefore, it is an object of the present invention to provide a crankshaft miller and a method of use thereof which enables three kinds of machining, of a pin journal, a main journal and a counterweight in addition to milling the crankshaft, thus avoiding the necessity of additional investment for a lathe and improving productivity.

In order to accomplish the above-mentioned objects, in accordance with one aspect of the invention, there is provided a crankshaft miller providing two cutter units provided movably in a longitudinal direction of a work between a pair of work heads provided on a bed and supporting both ends of the work. A cutter for machining a main journal and a first resting device are provided in one of the pair of cutter units, in which a pitch of the cutter for machining a main journal and the first resting device are selected such that when a counterweight is machined by means of the cutter for machining a main journal, a main journal which is located adjacent a counterweight forming a pair with the counterweight, is clamped by the first resting device. A cutter for machining a pin journal and a second resting device are provided in the other of the pair of cutter units. A pitch of the cutter for machining a pin journal and the second resting device are selected such that when a pin journal is machined by means of the cutter for machining a pin journal, the main journal adjacent the pin journal, is clamped by the second resting device.

With the construction set forth above, the outer peripheries of the counterweights can be machined by the cutter for the main journal when the main journal of the work is clamped by the first or second resting device, and thus no vibration such as chatter will be induced during machining so as to permit high precision machining. Therefore, it becomes unnecessary to machine the counterweight in a separate machining step. Namely, three kinds of machining, i.e. machining of the pin journal, the main journal and the outer periphery of the counterweight, can be performed by only the crankshaft miller. Therefore, extra investment for a lathe becomes unnecessary. Also, preparation, such as alignment and so forth in the separate machining step becomes unnecessary, improving productivity.

It should be noted that the first resting device and the second resting device are positioned inside of the cutter for machining the main journal and the cutter for machining the pin journal, or outside of the cutter for machining the main journal and the cutter for machining the pin journal. Furthermore, it is further possible that one and the other of the first resting device and the second resting device are positioned inside and outside of the cutter for machining the main journal and the cutter for machining the pin journal, respectively.

According to another aspect of the invention, there is provided a method of using a crankshaft miller which is constructed by two cutter units provided movably in a longitudinal direction of a work between a pair of work heads provided on a bed and supporting both ends of the work. A cutter for machining a main journal and a first resting device are provided in one of the pair of cutter units, in which a pitch of the cutter for machining a main journal and the first resting device is selected such that when a counterweight is machined by means of the cutter for machining a main journal, a main journal which is located adjacent a counterweight forming a pair with the counterweight, is clamped by the first resting device. A cutter for machining a pin journal and a second resting device are provided in the other of the pair of cutter units, in which a pitch of the cutter for machining a pin journal and the second resting device is selected such that when a pin journal is machined by means of the cutter for machining a pin journal, the main journal adjacent the pin journal, is clamped by the second resting device. The method is characterized in that at a condition where neither of the resting devices clamps the main journal, or where the main journal is clamped by the first resting device, other main journals and the pin journals are respectively machined, and at a condition where the main journal is clamped by the first resting device or the second resting device, the counterweight is machined.

Preferably, the method may be characterized by a first machining step in which a second main journal of the work is machined by the cutter for machining the main journal with the main journal clamped by neither resting devices.

A second machining step has a third main journal and a first pin journal respectively machined by the cutter for machining the main journal and the cutter for machining the pin journal with the second main journal clamped by the second resting device.

A third machining step has a fourth main journal and a second pin journal respectively machined by the cutter for machining the main journal and the cutter for machining the pin journal with the third main journal clamped by the second resting device.

A fourth machining step has a fifth main journal and a third pin journal respectively machined by the cutter for machining the main journal and the cutter for machining the pin journal with the fourth main journal clamped by the second resting device.

A fifth machining step has a fourth pin journal machined by the cutter for machining the pin journal with the fifth main journal clamped by the second resting device.

A sixth machining step has outer peripheries of an eighth counterweight and a fifth counterweight respectively machined by the cutter for machining the main journal and the cutter for machining the pin journal with the fourth main journal clamped by the first resting device.

A seventh machining step has an outer periphery of a seventh counterweight machined by the cutter for machining the main journal with the third main journal clamped by the second resting device.

A eighth machining step has outer peripheries of a sixth counterweight and a third counterweight respectively machined by the cutter for machining the main journal and the cutter for machining the pin journal with the third main journal clamped by the first resting device.

A ninth machining step has an outer periphery of a second counterweight machined by the cutter for machining the pin journal with the third main journal clamped by the first resting device. and A tenth machining step has outer peripheries of a fourth counterweight and a first counterweight respectively machined by the cutter for machining the main journal and the cutter for machining the pin journal with the second main journal clamped by the first resting device.

BRIEF DESCRIPTION OF THE DRAWINGS

The present invention will be understood more fully from the detailed description given herebelow and from the accompanying drawings of the preferred embodiment of the invention, which, however, should not be taken to be limitative of the present invention, but are for explanation and understanding only.

In the drawings:

FIG. 7 is an explanatory illustration showing a machining step of the crankshaft of the illustrated embodiment.

BEST MODE OF IMPLEMENTING THE INVENTION

The preferred embodiment of the crankshaft miller and the method of use thereof according to the present invention will be discussed hereinafter with reference to the accompanying drawings.

Figure 1:
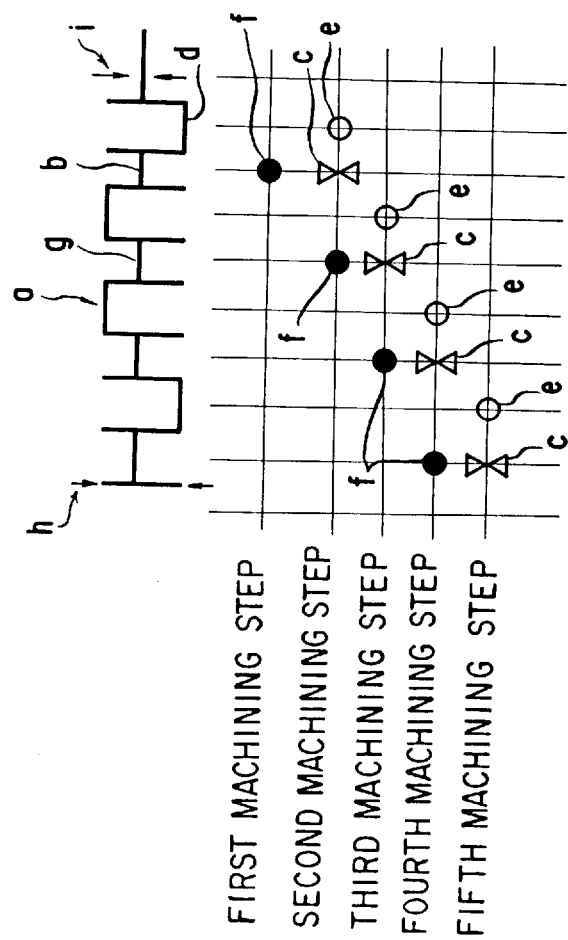
FIG. 1 is an explanatory illustration showing a machining step for a crankshaft by means of a conventional crankshaft miller.
Figure 2:
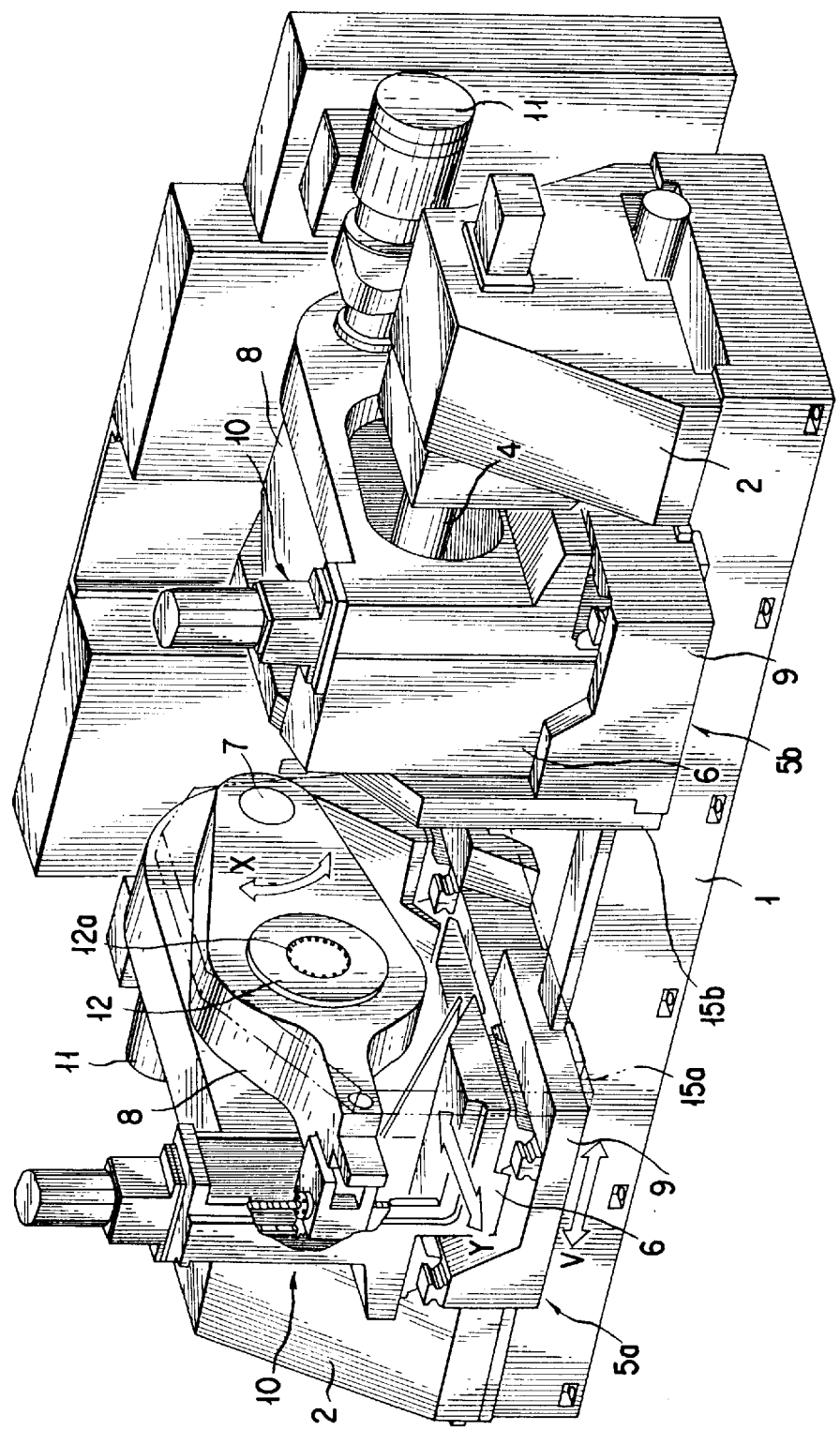
FIG. 2 is a perspective view of one embodiment of a crankshaft miller according to the present invention.

FIG. 2 is a perspective view of the overall construction of one embodiment of the crankshaft miller according to the present invention. In the drawings, 1 denotes a bed, and 2 denotes two work heads for supporting both ends of a work (crankshaft) 3 to be machined, which will be discussed later. The work heads 2 are respectively provided with chucks 4 for clamping both ends of the work 3 on opposing end surfaces.

5a and 5b denote two cutter units arranged between the work heads 2. These cutter units 5a and 5b have saddles 9 movable in a longitudinal direction (V direction) of the bed 1. On the saddles 9, slides 6 are provided in a movable fashion in a Y direction perpendicular to the V direction.

Then, on opposing surfaces of these slides 6, swing heads 8, each of which is rockably supported on a vertical surface of the saddle 9 at one end by a support shaft 7, are provided. The other ends of respective swing heads 8 are connected to rocking mechanisms 10 provided on the slides 6. By these rocking mechanisms 10, the other ends of respective swing heads are rocked in a vertical direction (X direction) about the support shafts 7.

On the other hand, within each of the swing heads 8, a cutter drum 12 which is driven to rotate by means of a cutter drum motor 11 is provided. On the other hand, on the inner periphery of the cutter drum 12, provided on the left side cutter unit 5a, a cutter 12a for machining a main journal is mounted, for example. Also, on the inner periphery of the cutter 12 provided on the right side cutter unit 5b, a cutter 12b for machining a pin journal is mounted, for example.

On the saddles 9 of the left and right cutter units 5a and 5b, a first resting device 15a and a second resting device 15b are provided at mutually opposing positions.

Figure 3:
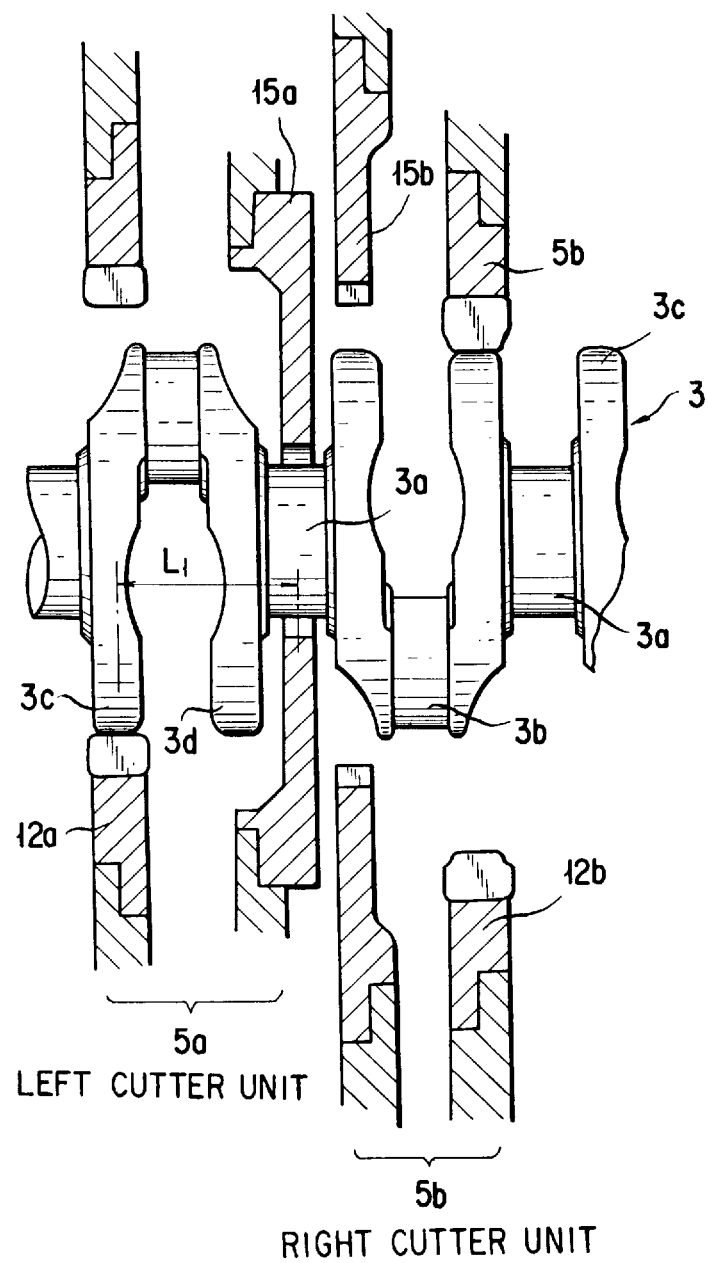
FIG. 3 is a section showing a construction of a cutter unit in the above-mentioned embodiment and a machining condition of a counterweight of the crankshaft miller.

As shown in FIG. 3, the cutter 12a for machining the main journal and the first resting device 15a provided on the left side cutter unit 5a are set at a pitch L, so that the first resting device 15a may clamp a main journal 3a adjacent a counterweight 3d forming a pair with the counterweight 3c when the counterweight 3c of the work 3 is machined by the cutter 12a for machining a main journal.

Figure 4:
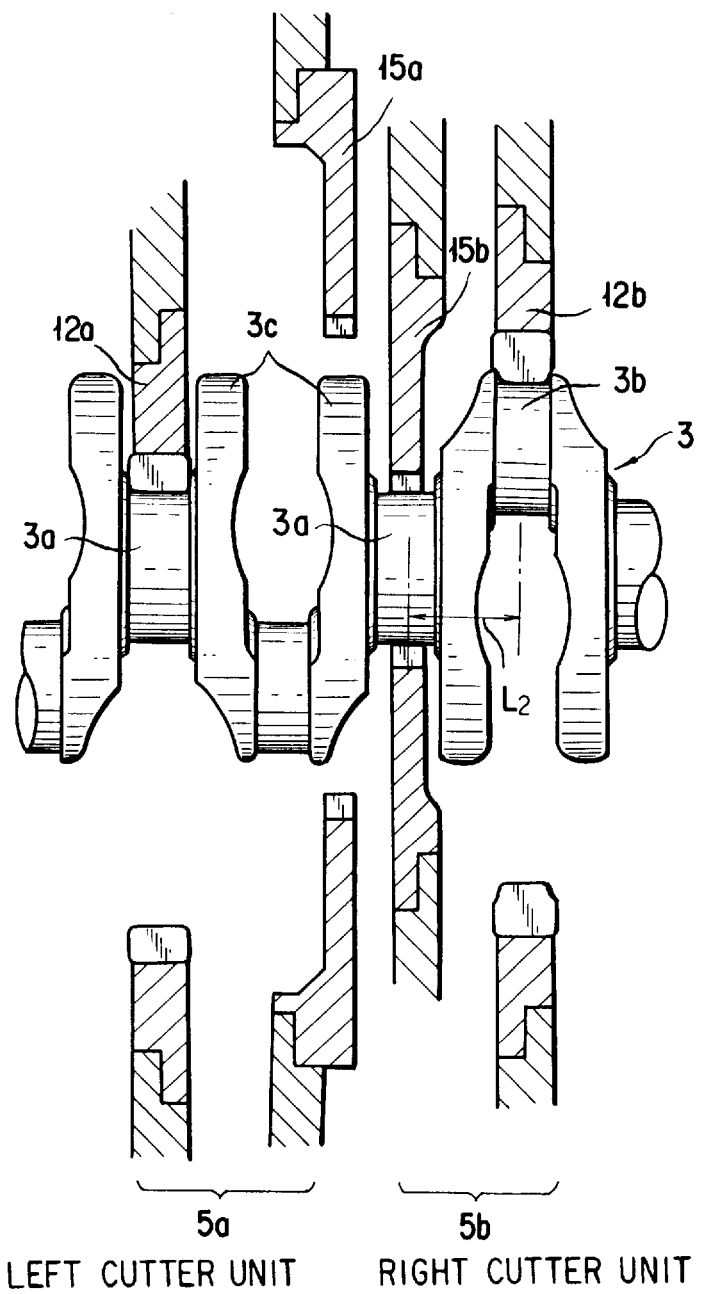
FIG. 4 is a section showing a machining condition of a main journal and a pin journal of the crankshaft miller by means of the above-mentioned cutter unit.

On the other hand, as shown in FIG. 4, the cutter 12b for machining the pin journal and the second resting device 15b provided on the right side cutter unit 5b are set at a pitch $L_2$ so that the second resting device 15b may clamp the adjacent main journal 3a when a pin journal 3b of the work is machined by the cutter 12b for machining the pin journal.

Figure 5:
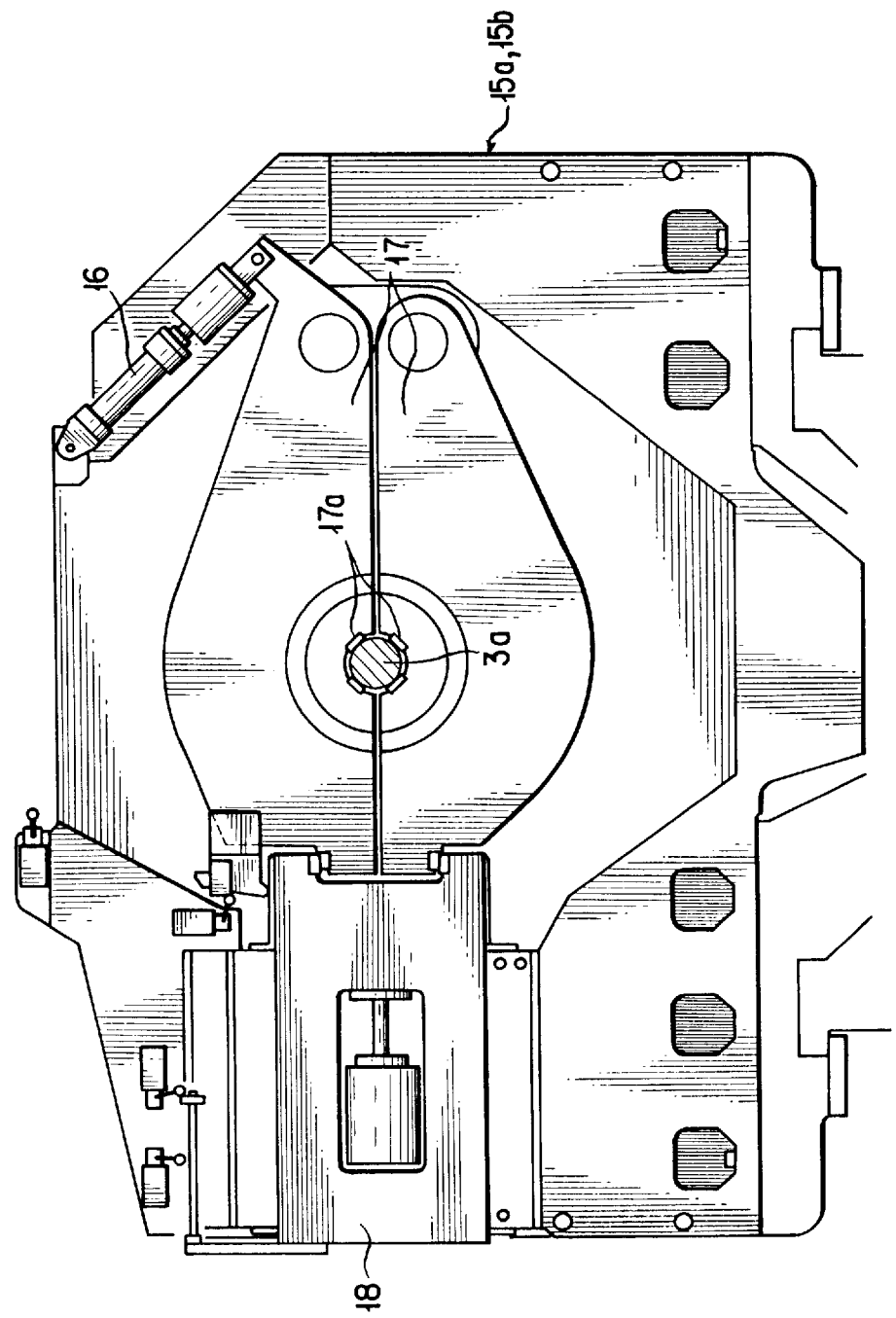
FIG. 5 is a side elevation of a resting device in the illustrated embodiment.

As shown in FIG. 5, the resting devices 15a and 15b have a pair of rest arms 17 opening and closing in vertical direction by means of arm cylinders 16. The rest arms 17 are provided with a plurality of pads 17a on the opposing surfaces for clamping the main journal 3a of the work 3 with the pads 17a. At the side of the pivoting ends of respective rest arms 17, lock mechanisms 18 are provided for locking so that both rest arms 17 may not open during machining of the work.

Figure 6A:
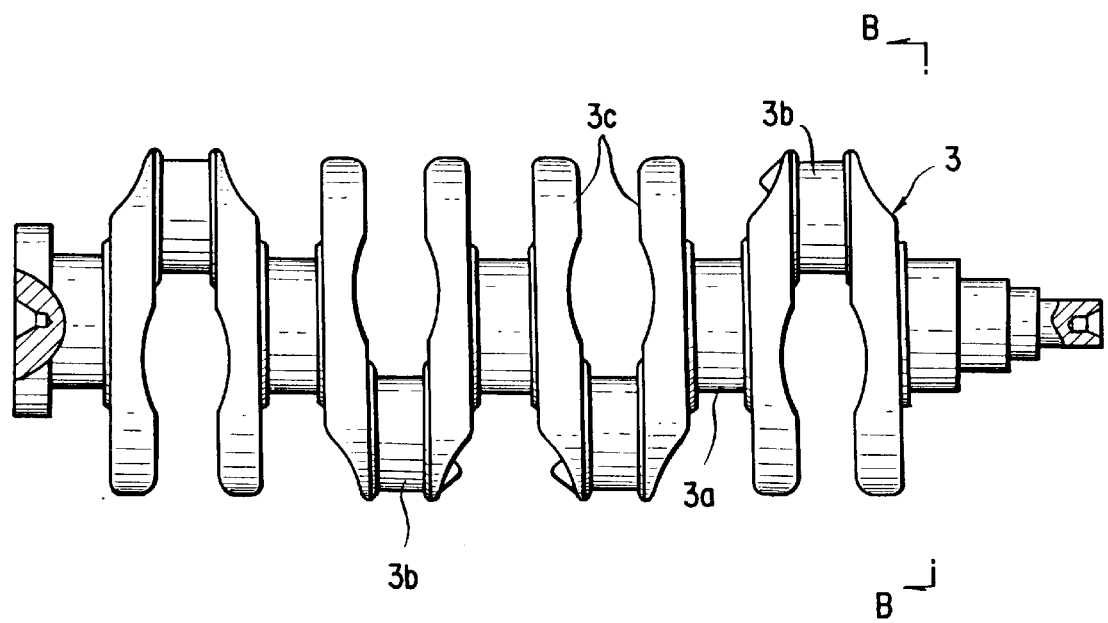
FIGS. 6A and 6B are respectively a partially cut out front elevation of a crankshaft machined by the illustrated embodiment and a section taken along line B—B of FIG. 6A.
Figure 6B:
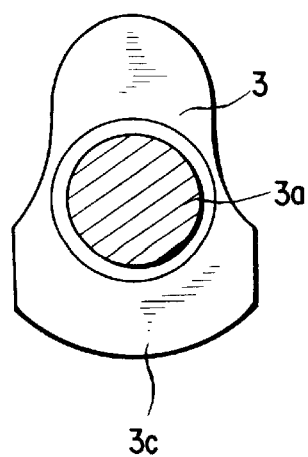
Figure 8A:
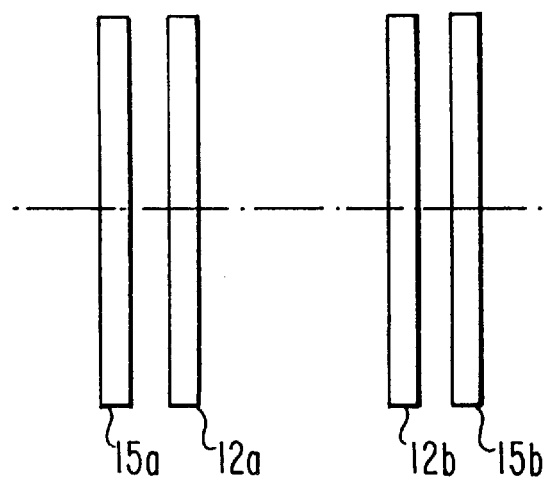
FIGS. 8A and 8B illustrated alternative arrangements of resting devices with respect to journal cutters.
Figure 8B:
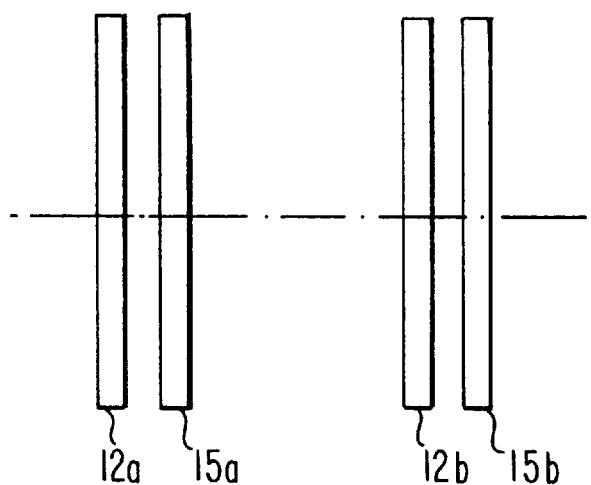

Next, will be discussed a method for machining the crankshaft 3 shown in FIGS. 6A and 6B by the illustrated embodiment.

As shown in FIG. 7, at a first machining step, both ends of the work 3 are merely clamped by the chucks 4 of both heads 2, and neither of first and second resting devices 15a and 15b clamp the work 3. In this condition, a second main journal $J_2$ is machined by the cutter 12a for machining the main journal.

Next, at a second machining step, indexing of the machining position by shifting the left and right cutter units 5a and 5b respectively to the third main journal $J_3$ and the first pin journal $P_1$ is performed. With the second major journal $J_2$, for which the machining of the first machining step is completed, clamped by the second resting device 15b, the third main journal $J_3$ and the first pin journal $P_1$ are respectively machined by the cutter 12a for machining the main journal and the cutter 12b for machining the pin journal.

Next, at a third machining step, the left and right cutter units 5a and 5b are respectively shifted to the fourth journal $J_4$ and the second pin journal $P_2$ by indexing of the machining positions. With the third main journal $J_3$, for which machining is completed at the second machining step, clamped by the second resting device, the fourth main journal $J_4$ and the second pin journal $P_2$ are respectively machined by the cutter 12a for machining the main journal and the cutter 12b for machining the pin journal.

Similarly, at a fourth machining step, the left and right cutter units 5a and 5b are respectively shifted to the fifth journal $J_5$ and the third pin journal $P_3$ by indexing the machining position. Then, with the fourth main journal J clamped by the second resting device 15b, the fifth main journal $J_5$ and the third pin journal $P_3$ are respectively machined by the cutter 12a for machining the main journal and the cutter 12b for machining the pin journal.

At a fifth machining step, the right cutter unit 5b is shifted to the position of the fourth pin journal $P_4$ by indexing of the machining position. Where the fifth main journal $J_5$ clamped by the second resting device 15b, the fourth pin journal $P_4$ is machined by the cutter 12b journal.

Subsequently, at a sixth machining step, by unclamping the second resting device 15b, the left and right cutter units 5a and 5b are respectively shifted to the positions of the eighth counterweight $C_8$ and the fifth counterweight $C_5$ by indexing. Then, with the fourth main journal $J_4$ clamped by the first resting device 15a, the outer peripheries of the eighth counterweight $C_8$ and the fifth counterweight $C_5$ are respectively machined by the cutter 12a for machining the main journal and the cutter 12b for machining the pin journal.

Similarly, in the subsequent machining steps necessary indexing is performed in each machining step.

At a seventh machining step, with the third main journal $J_3$ clamped by the second resting device 15b, the outer periphery of the seventh counterweight $C_7$ is machined by the cutter 12a for machining the main journal.

At an eighth machining step, with the third main journal $J_3$ clamped by the first resting device 15a, the outer peripheries of the sixth counterweight $C_6$ and the third counterweight $C_3$ are respectively machined by the cutter 12a for machining the main journal and the cutter 12b for machining the pin journal 12b.

Furthermore, at a ninth machining step, the third main journal $J_3$ is clamped by the first resting device 15a, and the outer periphery of the second counterweight $C_2$ is machined by the cutter 12b for machining the pin journal.

At a tenth machining step, with the second main journal $J_2$ is clamped by the first resting device 15a, the outer peripheries of the fourth counterweight $C_4$ and the first counterweight $C_1$ are respectively machined by the cutter 12a for machining the main journal and the current 12b for machining the pin journal.

It should be noted that the foregoing machining order may be modified in relation to the leading and following machining steps, or, in the alternative, machining may be neglected by machining in the former machining step. Also, depending upon the configuration of the work, number of times of indexing can be made plural and a machining step may be neglected.

On the other hand, the first resting device 15a and the second resting device 15b are positioned inside of the cutter 12a for machining the main journal and the cutter 12b for machining the pin journal in the case of the illustrated embodiment. It may also be possible that the first resting device 15a and the second resting device 15b are placed outside of the cutter 12a for machining the main journal and the cutter 12b for machining the pin journal. One or the other of the first resting device 15a and the second resting device 15b may be positioned at respective inside and outside position of the cutter 12a for machining for main journal and the cutter 12b for machining for pin journal.

As discussed in detail, by the crankshaft miller and the method of use according to the present invention, since machining of the outer periphery of the counterweight by the cutter for machining the main journal becomes possible with the main journal of the work clamped by the resting device, vibration such as chatter should not be caused during machining of the work. Thus, machining with high precision becomes possible, and machining of the counterweight in a separate process becomes unnecessary. Namely, by only the crankshaft miller, three kinds of machining, for the pin journal, the main journal and the counterweight, can be done. Therefore, the extra investment for a lathe becomes unnecessary. Also, since preparation, such as aligning in a separate machining step, is not necessary, the productivity is improved.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments within the scope encompassed and equivalents thereof by the appended claims.

I claim:

1. A method of using a crankshaft miller constructed by
   providing two cutter units provided movably in longitudinal direction of a work between a pair of work heads provided on a bed and supporting both ends of the work,
   providing a cutter for machining a main journal and a first resting device in one of said pair of cutter units, in which a pitch of said cutter for machining a pin journal and said first resting device is selected such that when a counterweight is machined by means of the cutter for machining a main journal, a main journal which is located adjacent a counterweight forming a pair with said counterweight, is clamped by said first resting device, and
   providing a cutter for machining a pin journal and a second resting device in the other of said pair of cutter unit, in which a pitch of said cutter for machining a pin journal and said second resting device is selected such that when a pin journal is machined by means of the cutter for machining a pin journal, the main journal adjacent said pin journal, is clamped by said second resting device, the method is characterized in that at a condition where neither of resting devices clamps the main journal or where the main journal is clamped by said first resting device, other main journals and said pin journals are respectively machined, and at a condition where the main journal is clamped by said first resting device or said second resting device, said counterweight is machined.

2. A method of use of said crankshaft miller as set forth in claim 1, characterized in that at a first machining step, a second main journal of the work is machined by said cutter for machining the main journal in the condition whether the main journal is clamped by neither resting devices;

at a second machining step, a third main journal and a first pin journal are respectively machined by said cutter for machining the main journal and said cutter for machining the pin journal in the condition where said second main journal is clamped by said second resting device;

at a third machining step, a fourth main journal and a second pin journal are respectively machined by said cutter for machining the main journal and said cutter for machining the pin journal in the condition where said third main journal is clamped by said second resting device;

at a fourth machining step, a fifth main journal and a third pin journal are respectively machined by said cutter for machining the main journal and said cutter for machining the pin journal in the condition where said fourth main journal is clamped by said second resting device;

at a fifth machining step, a fourth pin journal is machined by said cutter for machining the pin journal in the condition where said fifth main journal is clamped by said second resting device;

at a sixth machining step, outer peripheries of an eighth counterweight and a fifth counterweight are respectively machined by said cutter for machining the main journal and said cutter for machining the pin journal in the condition where said fourth main journal is clamped by said first resting device;

at a seventh machining step, an outer periphery of a seventh counterweight is machined by said cutter for machining the main journal in the condition where said third main journal is clamped by said second resting device;

at an eighth machining step, outer peripheries of a sixth counterweight and a third counterweight are respectively machined by said cutter for machining the main journal and said cutter for machining the pin journal in the condition where said third main journal is clamped by said first resting device;

at a ninth machining step, a outer periphery of a second counterweight is machined by said cutter for machining the pin journal in the condition where said third main journal is clamped by said first resting device; and at a tenth machining step, outer peripheries of a fourth counterweight and a first counterweights are respectively machined by said cutter for machining the main journal and said cutter for machining the pin journal in the condition where said second main journal is clamped by said first resting device.

3. A crankshaft miller for milling a crankshaft having main journals, counterweights and pin journals, said crankshaft miller comprising a bed having a pair of work heads thereon for supporting a work there between in a longitudinal direction;

first and second cutter units provided so as to be movable in the longitudinal direction between said work heads;

said first cutter unit comprising a first main journal cutter for machining a main journal and that is also capable of machining a counterweight, and a first resting device, said first main journal cutter and said first resting device having a pitch such that when one counterweight of the crankshaft is machined by said first main journal cutter, said first resting device is located adjacent to and can clamp a main journal of the crankshaft, which main journal is located adjacent an other counterweight, the other counterweight being adjacent to and forming a counterweight pair with the one counterweight; and said second cutter unit comprising a second pin journal cutter for machining a pin journal and that is also capable of machining a counterweight, and a second resting device, said second pin journal cutter and said second resting device having a pitch such that when said second pin journal cutter machines a pin journal of the crankshaft, said second resting device is located adjacent to and can clamp a main journal of the crankshaft adjacent to the pin journal being machined.

4. The crankshaft miller of claim 3, wherein said first resting device and said second resting device are positioned between said first main journal cutter and said second pin journal cutter.

5. The crankshaft miller of claim 3, wherein said first main journal cutter and said second pin journal cutter are positioned between said first resting device and said second resting device.

6. The crankshaft miller of claim 3, wherein one of said first main journal cutter and said second pin journal cutter is positioned between said first resting device and said second resting device and one of said first resting device and said second resting device is positioned between said first main journal cutter and said second pin journal cutter.

7. A crankshaft miller for milling a crankshaft having main journals, counterweights and pin journals, said crankshaft miller comprising:

a bed having a pair of work heads thereon for supporting a work there between in a longitudinal direction;

first and second cutter units provided so as to be movable in the longitudinal direction between said work heads;

said first cutter unit comprising a first main journal cutter for machining a main journal and a first resting device cooperating with said first cutter unit, said first main journal cutter and said first resting device having a pitch such that when one counterweight of the crankshaft is machined by said first main journal cutter, said first resting device is located adjacent to and can clamp a main journal of the crankshaft, which main journal is located adjacent an other counterweight, the other counterweight being adjacent to and forming a counterweight pair with the one counterweight; and said second cutter unit comprising a second pin journal cutter for machining a pin journal and a second resting device, said second pin journal cutter and said second resting device having a pitch such that when said second pin journal cutter machines a pin journal of the crankshaft, said second resting device is located adjacent to and can clamp a main journal of the crankshaft adjacent to the pin journal being machined;

wherein said first main journal cutter and said second pin journal cutter are positioned between said first resting device and said second resting device.

8. A crankshaft miller for milling a crankshaft having main journals, counterweights and pin journals, said crankshaft miller comprising:

a bed having a pair of work heads thereon for supporting a work there between in a longitudinal direction;

first and second cutter units provided so as to be movable in the longitudinal direction between said work heads;

said first cutter unit comprising a first main journal cutter for machining a main journal and a first resting device cooperating with said first main journal cutter, said first main journal cutter and said first resting device having a pitch such that when one counterweight of the crankshaft is machined by said first main journal cutter, said first resting device is located adjacent to and can clamp a main journal of the crankshaft, which main journal is located adjacent an other counterweight, the other counterweight being adjacent to and forming a counterweight pair with the one counterweight; and said second cutter unit comprising a second pin journal cutter for machining a pin journal and a second resting device, said second pin journal cutter and said second resting device having a pitch such that when said second pin journal cutter machines a pin journal of the crankshaft, said second resting device is located adjacent to and can clamp a main journal of the crankshaft adjacent to the pin journal being machined;

wherein said first resting device is located between said first main journal cutter and said second pin journal cutter, and said second resting device is located outside of between said first main journal cutter and said second pin journal cutter.

* * * * *